A. W. AITKEN.
ROAD ROLLER.
APPLICATION FILED MAY 16, 1921.

1,427,751.

Patented Aug. 29, 1922.
2 SHEETS—SHEET 1.

Inventor
Andrew W. Aitken
By
Attorneys

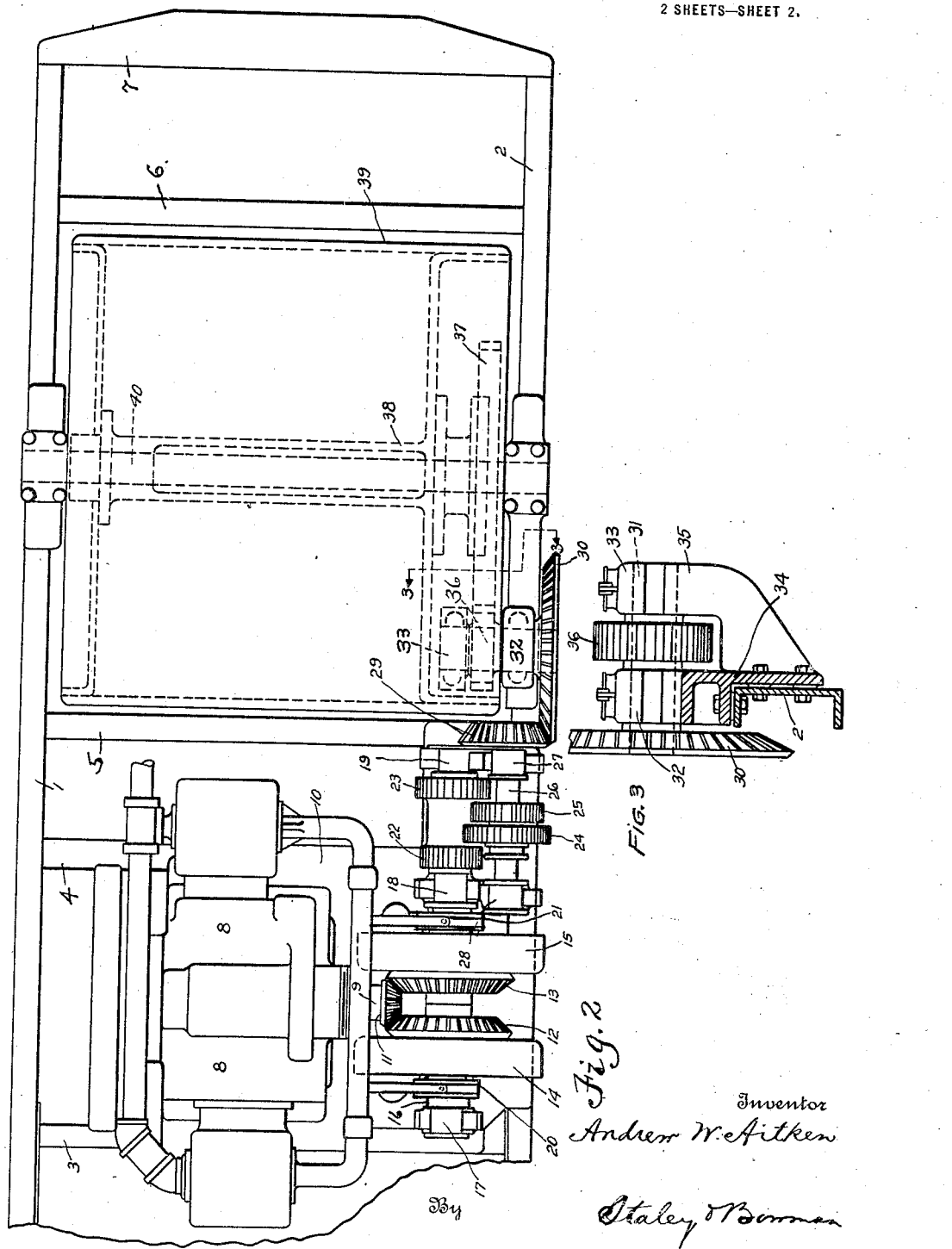

UNITED STATES PATENT OFFICE.

ANDREW W. AITKEN, OF SPRINGFIELD, OHIO, ASSIGNOR TO THE BUFFALO-SPRINGFIELD ROLLER COMPANY, OF SPRINGFIELD, OHIO, A CORPORATION OF OHIO.

ROAD ROLLER.

1,427,751.  Specification of Letters Patent.  Patented Aug. 29, 1922.

Application filed May 16, 1921. Serial No. 469,928.

*To all whom it may concern:*

Be it known that I, ANDREW W. AITKEN, a citizen of the United States, residing at Springfield, in the county of Clark and State of Ohio, have invented certain new and useful Improvements in Road Rollers, of which the following is a specification.

This invention relates to improvements in road rollers, particularly of the tandem type, it especially relating to the transmission mechanism thereof.

The type of machine to which my invention relates is one in which an internal combustion engine is employed for the motive power having its crank shaft arranged in a transverse direction across the frame of the machine, or parallel with the axes of the rolls, with the shafts of the transmission mechanism extending in a longitudinal direction at one side of the frame of the machine, and the particular object of invention is to provide a driving connection from such type of transmission mechanism to the rear roll such that side strain upon the rear roll due to the driving stress is eliminated.

A further object of the invention is to provide a transmission mechanism and connection between the motor and rear roller which will be simple in construction and effective in its operation.

Referring to the drawings:—

Fig. 2 is a top plan view of the same.

Fig. 3 is a section on the line 3—3 in Fig. 2.

Figure 1:
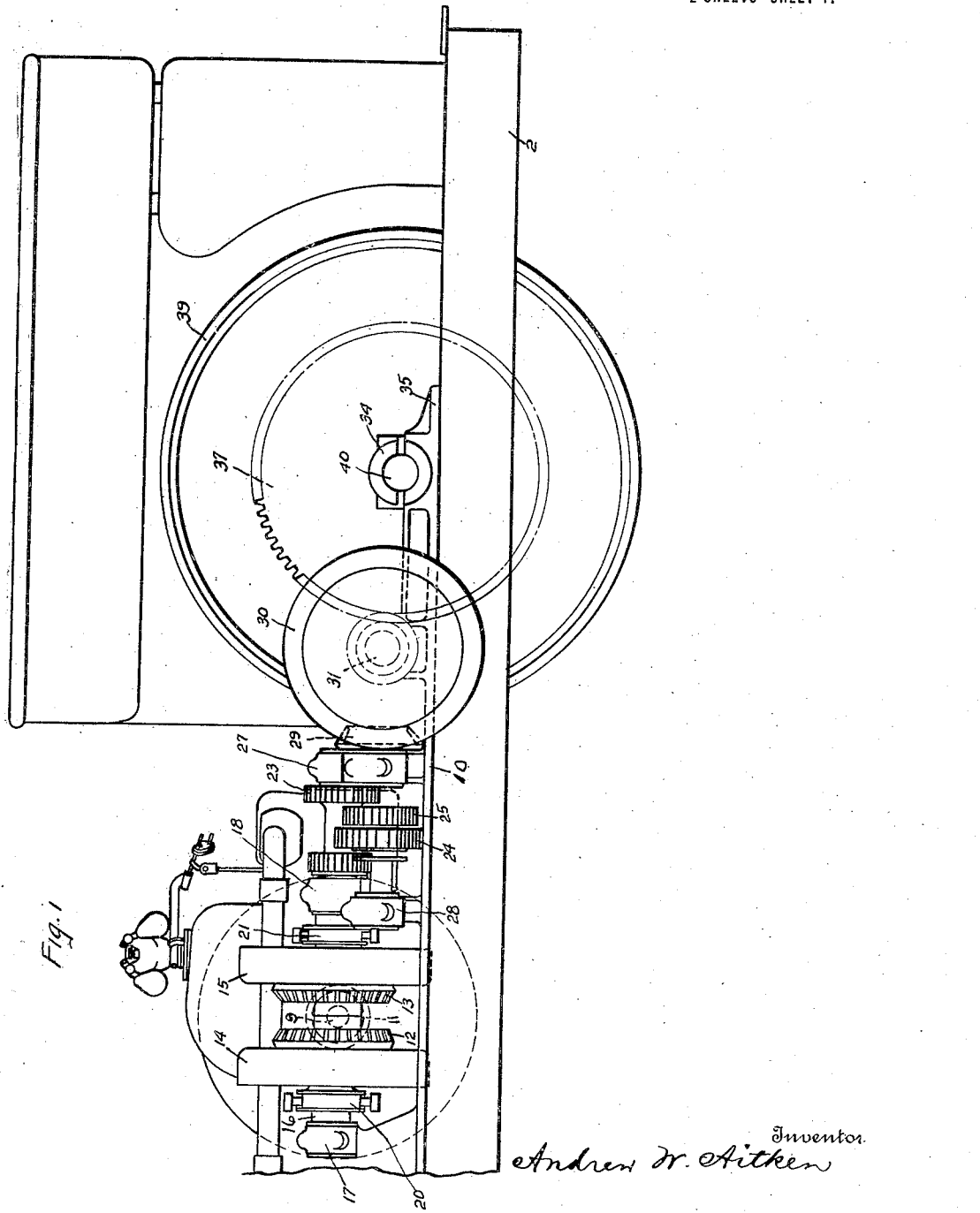
Fig. 1 is a side elevation of so much of a machine as is necessary to illustrate my improvements.

Referring to the drawings 1 and 2 represent the side frame members and 3, 4, 5, 6, and 7 cross frame members. 8 represents in a general way an internal combustion engine of any suitable type, the crank shaft 9 of which is disposed in a transverse direction relatively to the frame. This motor 8 is supported upon a mounting 10 which will be described more in detail hereinafter. The crank shaft 9 carries at one end a bevelled pinion 11 meshing with bevelled gears 12 and 13 having connected therewith drums 14 and 15; the bevelled gears and their drums being loosely mounted upon a shaft 16, journaled in a series of three aligned bearings upon the mounting 10; 17, 18 and 19 representing the bearing caps. Each of the drums 14 and 15 forms one member of a clutch of the internal expanding shoe type; 20 and 21 representing, respectively, grooved collars splined to the shaft 16 and movable longitudinally thereon by well known means for the purpose of alternately engaging and disengaging the drums by the shoes (not shown) so as to impart a forward or reverse direction of rotation to the shaft 16 in a well known manner. The shaft 16 has rotatably connected therewith a pair of connected spur gears 22 and 23 arranged to be engaged singly by one of a pair of connected gears 24 and 25, slidably mounted upon but rotatably connected with a counter-shaft 26. This counter-shaft 26 is mounted in two alined bearings on the mounting 10, 27 and 28 representing the caps thereof.

The rear end of the counter-shaft 26 has connected therewith a bevelled pinion 29, in mesh with a bevelled gear 30 on the outer end of a short transverse shaft 31, which is carried in bearings 32 and 33 mounted respectively upon a bracket 34 and its arm 35; the bracket being secured to the side frame member 2. Secured to the shaft 31 between the bearings is a spur pinion 36, meshing with a spur gear 37, secured to the hub 38 of the rear roll 39; the hub being rotatably mounted upon a stationary shaft 40 carried by the side frame members 1 and 2.

In rollers of this character as heretofore constructed, in which the crank shaft of the motor was arranged in a transverse direction and the shafts of the transmission mechanism in a longitudinal direction, it has been common to provide the roll with bevelled gear teeth meshing with a bevelled pinion associated with transmission mechanism, as a result of which the roll is subjected to lateral strain at a point removed from the axis thereof due to the driving stress, which results in a considerable uneven wear in the bearings of the roll, thereby causing the roll to be forced out of a true line relatively to the direction of travel, thereby causing a separation of the bevelled gears. By the arrangement described, however, by which the power is transmitted directly to the roll through a spur gear and pinion, such lateral strain is eliminated. While applicant is aware that it has been common to provide the driven roll with a spur gear receiving motion from a spur pinion, yet such an arrangement has been employed in connection with transmission mechanism whose shafts were arranged in a transverse direction, but by applicant's arrangement it is possible to retain the spur gear drive and the consequent advantages thereof in connection with longitudinally arranged transmission mechanism so constructed and arranged as to transmit the power from the motor shaft to the spur gear of the roll; transmission mechanism of this type having the advantage of being more simple in its construction, requiring fewer gears, and also permitting the same to be located at the side of the machine where it is more accessible to the operator.

Having thus described my invention, I claim:—

1. In a machine of the character described, a driven roll, a motor having its shaft arranged parallel with the axis of said roll, transmission mechanism receiving motion from said motor shaft and rotatable upon axes arranged at right-angles to the axes of said motor shaft and roll comprising a bevelled pinion, a bevelled gear in mesh with said bevelled pinion, a spur pinion connected with said bevelled gear, the axes of said bevelled gear and spur pinion being parallel with the axis of said roll, and a spur gear connected with said roll and meshing with said spur pinion.

2. In a machine of the character described, a driven roll, a motor having its shaft arranged parallel with the axis of said roll, a longitudinally arranged shaft receiving motion from said motor shaft, a bevelled pinion carried by said longitudinal shaft, a short shaft arranged parallel with the axis of said roll, a bevelled gear carried by said short shaft in mesh with said bevellel pinion, a spur gear connected with said roll, and a spur pinion carried by said short shaft in mesh with said spur gear.

3. In a machine of the character described, a driven roll, a motor having its shaft arranged parallel with the axis of said roll, a longitudinal shaft together with means for driving the same in either direction from said motor shaft, a counter-shaft arranged parallel with said longitudinal shaft, together with change of speed gearing between said shafts, a bevelled pinion carried by said counter-shaft, a short shaft arranged parallel with the axis of said roll, a bevelled gear on said short shaft meshing with said bevelled pinion, a spur gear connected with said roll, and a spur pinion on said short shaft meshing with said spur gear.

4. In a machine of the character described, a driven roll, a motor having its shaft arranged parallel with the axis of said roll, a bevelled pinion connected with said motor shaft, a transmission shaft arranged at right-angles to said motor shaft, a pair of clutch members loosely mounted on said transmission shaft and geared to said motor pinion so as to rotate in opposite directions, said clutch members being arranged to be alternately engaged with said transmission shaft, a counter-shaft arranged parallel with said transmission shaft, gearing between said shafts arranged to furnish a change of speed to said countershaft, a bevelled pinion connected with said countershaft, a short shaft supported by the frame of the machine and having a bevelled gear meshing with said bevelled pinion, a spur pinion connected with said short shaft, and a spur gear connected with said roll and meshing with said spur pinion.

5. In a machine of the character described, a driven roll, a motor having its shaft arranged parallel with the axis of said roll, transmission mechanism receiving motion from said motor shaft and rotatable upon axes arranged at right angles to the axes of said motor and roll, a spur gear connected with said roll, a spur pinion meshing with said gear, the axes of said spur pinion and spur gear being parallel with the axis of said roll, and an operative connection between said spur pinion and said transmission mechanism.

In testimony whereof, I have hereunto set my hand this 6th day of May, 1921.

ANDREW W. AITKEN.

Witness:
CHAS. I. WELCH.